Figure 1:
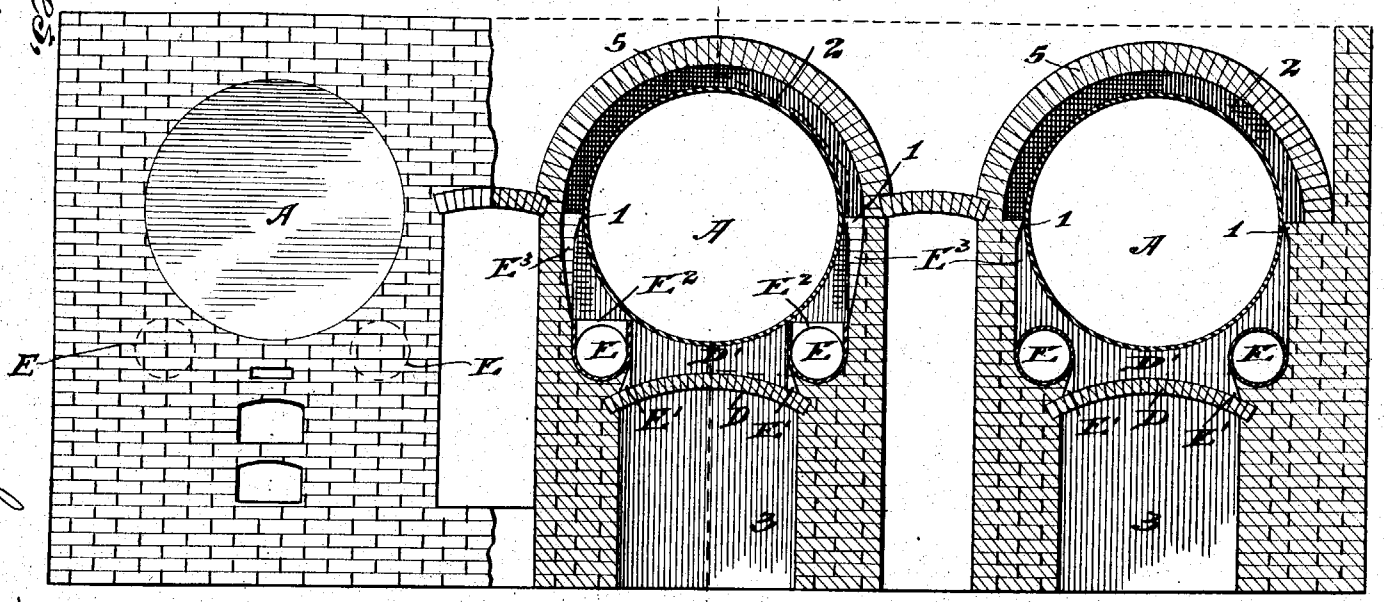

No. 12,208. REISSUED MAR. 22, 1904.

G. O. GILMER.

APPARATUS FOR THE DESTRUCTIVE DISTILLATION OF WOOD.

APPLICATION FILED DEC. 24, 1902.

3 SHEETS—SHEET 1.

Witnesses,
F. D. Mann,
Albert W. Snare

Inventor,
George O. Gilmer,
By Offield Towle & Linthicum
Att'ys.

No. 12,208. REISSUED MAR. 22, 1904.
G. O. GILMER.
APPARATUS FOR THE DESTRUCTIVE DISTILLATION OF WOOD.
APPLICATION FILED DEC. 24, 1902.
3 SHEETS—SHEET 2.
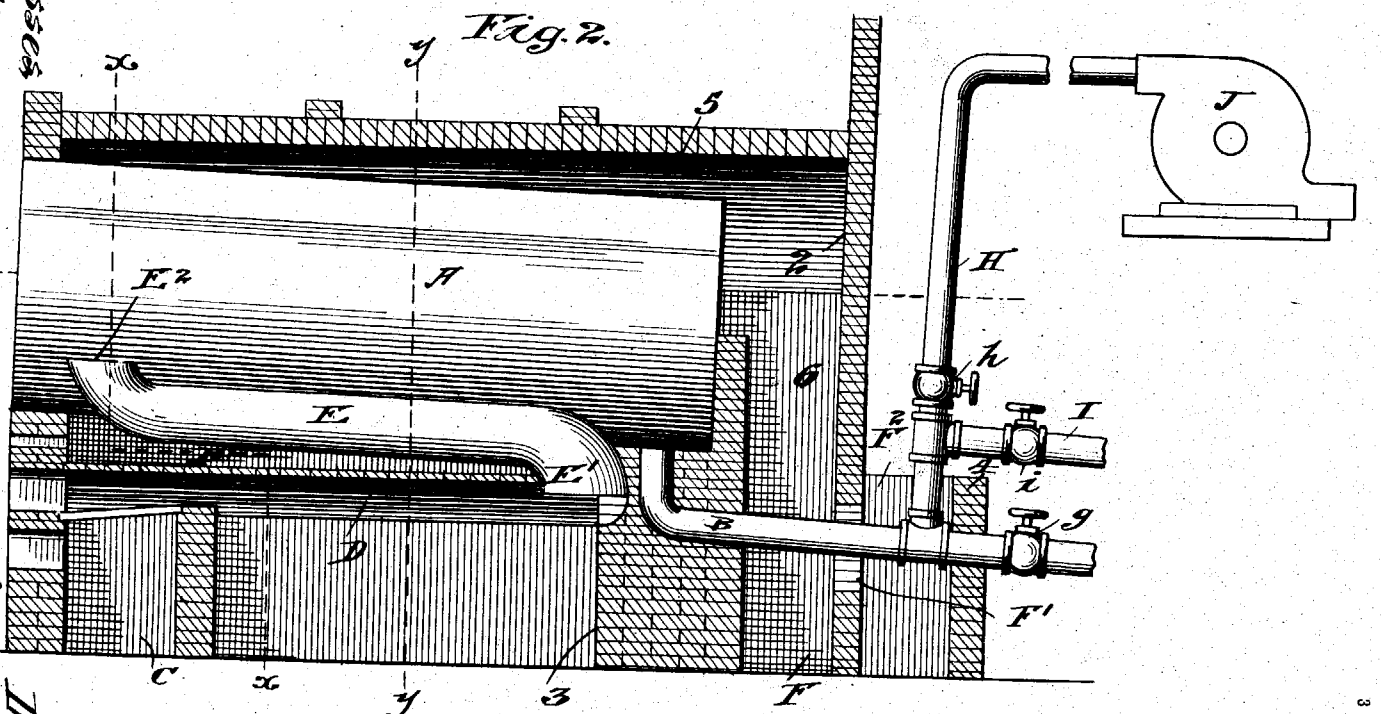
Witnesses,
R. S. Mann,
Albert L. Snare
Inventor,
George O. Gilmer,
By Offield Towle & Linthicum,
Att'ys.

No. 12,208. REISSUED MAR. 22, 1904.
G. O. GILMER.
APPARATUS FOR THE DESTRUCTIVE DISTILLATION OF WOOD.
APPLICATION FILED DEC. 24, 1902.
3 SHEETS—SHEET 3.
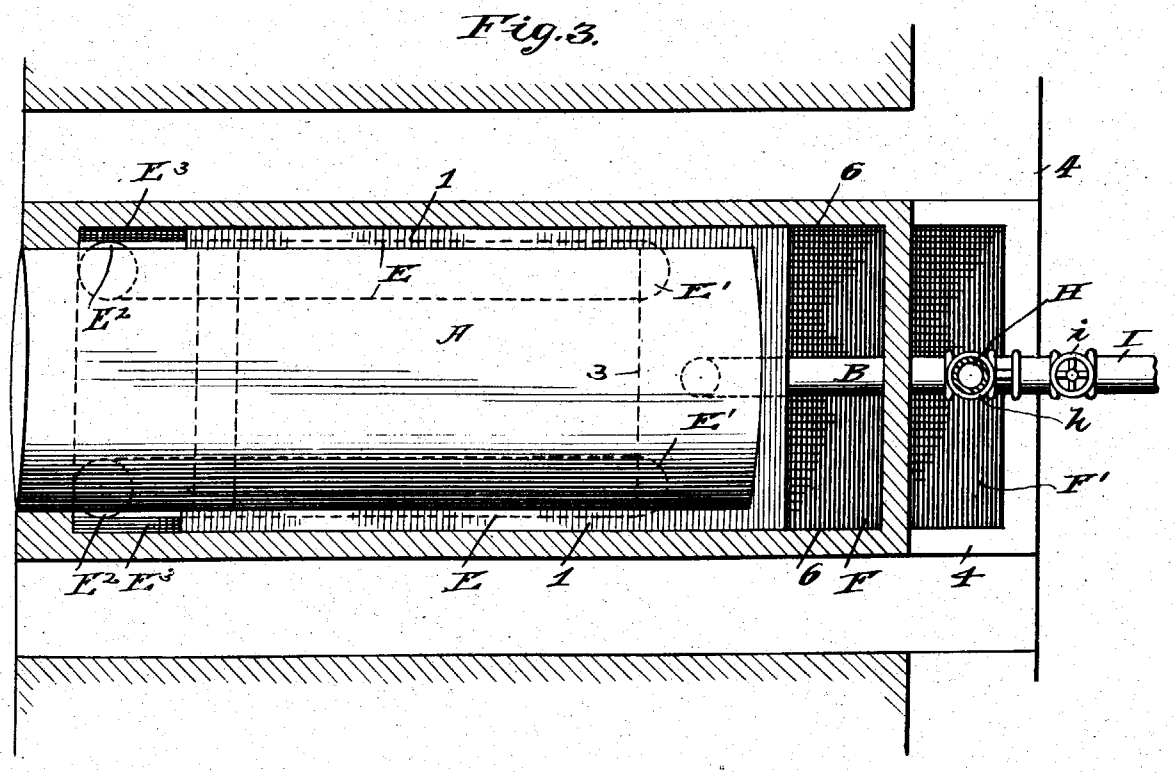
Witnesses,
R. E. Mann,
Albert N. Sparre
Inventor,
George O. Gilmer
By Offield Towler & Lithicum
Att'ys.

No. 12,208. Reissued March 22, 1904.

UNITED STATES PATENT OFFICE.

GEORGE O. GILMER, OF NEW ORLEANS, LOUISIANA, ASSIGNOR, BY MESNE ASSIGNMENTS, TO ILLINOIS INVESTMENT COMPANY, A CORPORATION OF WEST VIRGINIA.

APPARATUS FOR THE DESTRUCTIVE DISTILLATION OF WOOD.

SPECIFICATION forming part of Reissued Letters Patent No. 12,208, dated March 22, 1904.

Original No. 677,204, dated June 25, 1901. Application for reissue filed December 24, 1902. Serial No. 136,503.

*To all whom it may concern:*

Be it known that I, GEORGE O. GILMER, residing at New Orleans, in the parish of Orleans and State of Louisiana, have made certain new and useful Improvements in Apparatus for the Destructive Distillation of Wood, of which the following is a specification.

My invention is an improved apparatus for use in producing turpentine, tar, wood-alcohol, and other products, including charcoal, from fat pine; and the invention has for its salient objects to provide a simple construction by which the vapors of different products, and particularly the turpentine-vapor, may be drawn from the retort without becoming contaminated with other vapors; to provide a construction by which the vapors are generated progressively from the contents of the retort and are drawn from the latter in advance of the progress of the heat; to provide a construction in which the lower part of the retort wherein the tar collects during the process is maintained cool enough to prevent overheating of the tar; to provide a construction in which the outlet passage or pipe through which the tar is withdrawn extends through a moderately-heated zone, whereby the tar is maintained fluid until it reaches the receiving-receptacle; to provide an improved construction and apparatus whereby all of the vapor and liquid products of distillation may be withdrawn through a single pipe communicating with the retort, and, finally and generally, to provide improved details of construction and arrangement in an apparatus of the character referred to.

The invention consists in certain novel constructions and combination of parts, as will be hereinafter described and claimed.

In the drawings, Figure 1 is a front elevation, partly in section, showing a battery of retorts and their furnaces embodying my invention. In this figure the still at the left is shown in front elevation, that in the middle in section on about line *x x* of Fig. 2, and that at the right on about line *y y* of Fig. 2. Fig. 2 is a longitudinal section drawn through one of the retorts on about line 2 2 of Fig. 1, and Fig. 3 is a sectional plan view of one of the retorts on about line 3 3 of Fig. 2.

In carrying out my invention I employ a closed retort, within which the body of wood to be treated is placed, and this retort is subjected to externally-applied heat so controlled and applied thereto that the contents of the retort are heated progressively. In the process of dry distillation of wood the turpentine-vapor is expelled at a lower temperature than the acid and creosotic vapors, and accordingly when the heat is applied progressively the turpentine-vapors are the first to be driven off. In carrying out my invention I take advantage of this fact and so construct and arrange the apparatus that the turpentine-vapors are withdrawn practically as fast as formed and withdrawn in such manner as to be drawn away from or in advance of the heat as distinguished from drawing them off in such manner that they might pass through more highly heated parts of the retort, and thus become contaminated with other vapors. I accomplish this by locating the vapor-outlet (which in the preferred construction shown in the present embodiment of the invention constitutes the only outlet) in a part of the retort remote from that part of the retort to which the heat is first applied. In view of the fact that gases heated within a closed receptacle like a retort tend always to rise to the highest portion thereof I take advantage of this fact and preferably apply the heat to the top of the retort, thereby securing a more perfect control of the progressive heating of the contents thereof. By this arrangement I am also enabled to locate the eduction-pipe at the bottom of the retort, so that it may serve the double function of conveying away both the vapors and the liquid products of distillation. Moreover, by applying the heat to the top of the retort the bottom thereof remains cool until the very last stages of the distillation or until the tar, which is the last of the products expelled, has been fully withdrawn.

Having explained the general characteristics of my invention, I will now describe the specific details of construction of a preferred embodiment thereof.

Referring to the drawings, A designates a series of retorts, which are preferably of steel of cylindrical form and horizontally disposed, one end of each retort, preferably the rear, being inclined downwardly slightly, so as to direct the liquid products toward that end. The furnace C is arranged below the retort, the fire-box thereof being located below the front end of the retort, and a protecting-wall D extends above the furnace and rearwardly below the retort to a point near the rear end of the latter, so as to completely partition the space immediately below the retort from the combustion-space of the furnace. The partition D extends from the front to the rear end walls of the furnace and forms a dead-air space D′ below the retort, extending nearly the full length of the latter. The products of combustion pass from the furnace rearwardly below the wall D and enter at the rear end of said wall-flues E, of which I provide two, one at each side of the apparatus, arranged to extend in a generally horizontal direction, their inlet ends E′ being turned downwardly through the wall D′ and their outlet ends $E^2$ being turned upwardly and communicating with upwardly-extending flue-passages $E^3$ in the walls of the furnace, which conduct the products of combustion to and discharge the same upon the top of the retort, at a point near the front end thereof, as will be more readily understood by reference to the several figures of the drawings.

Walls 1 are arranged to close the space on opposite sides of the retort above the flues E, these walls terminating at points near the front end of the retort and forming the flue-passages $E^3$, hereinbefore referred to. The front end of the retort and the lower half of the rear end thereof are seated in the front wall of the furnace and a transverse partition-wall 3, respectively, so that said walls, in conjunction with the top wall of the furnace and the side walls 1, hereinbefore referred to, serve to confine the products of combustion to the upper half of the retort.

In Fig. 1 the shaded portion, designated 2, represents the inner face of the back wall of the furnace, which is also designated by the same numeral in Fig. 2, and the numeral 3 is applied to the front face of the partition-wall, which supports the rear end of the retort. The part designated 4 in Figs. 2 and 3 is an extension-wall, which forms a support for the eduction-pipe B and incloses a space $F^2$, which constitutes the uptake flue or outlet of the furnace. In Fig. 2 the numeral 5 designates the inner surface of the top wall of the furnace, and the numeral 6 in Figs. 2 and 3 designates the inner faces of the upright or side walls, which form the vertical sides of the smoke-chamber F, into which the products of combustion pass after circulating back over the top of the retort. The smoke-chamber F communicates with the outlet-flue $F^2$ through a passage F′, as best shown in Fig. 2.

The vapor-discharge pipe B communicates with the bottom of the retort, at a point near the rear end thereof, extending thence vertically downward a short distance and then horizontally out through the smoke-chamber F, the passage F′, and the outlet-flue $F^2$, the end of said pipe being continued on beyond the furnace to any suitable point and being provided at a point just outside of the furnace with a controlling-cock *g*. At a point preferably within the outlet-flue $F^2$ a branch uptake-pipe H communicates with the eduction-pipe B, this pipe H constituting the turpentine-vapor pipe and which is likewise provided with a controlling-cock *h*, by which it may be closed. Said pipe *h* leads to any suitable condenser, (not shown,) the turpentine-vapors being drawn off from the retort by means of a pump, which is indicated at J and is preferably a vacuum located in the distillery. At a point a short distance above the eduction-pipe B a pipe I is connected with the vapor-pipe H and preferably arranged to lead horizontally therefrom, said pipe I being likewise provided with a controlling cock or valve *i*. Through this pipe I the tar-oils, the creosote, and pyroligneous acids pass to suitable condensers. (Not shown.) By the several valves described I am able to control the discharge of the several products of distillation and to discharge the same to the desired points.

In operation of the apparatus the retort is filled with wood and hermetically sealed. The fire is lighted in the furnace, and the products of combustion pass backwardly under the protecting-wall D, thence forward through the flues E, and then up through flue-passages $E^3$ to the chamber which incloses the top of the retort, thus heating the contents of the retort at the top first. The turpentine-vapors are the first to be expelled, are drawn off through the eduction-pipe B by the exhaust action of the pump, and it follows that said turpentine-vapors flow downwardly through the cooler parts of the retort and in a direction away from the hotter portion thereof. Since the vapors which are detrimental to turpentine are not generated until the wood has been heated to a temperature higher than that at which the turpentine-vapors are given off, it follows that the turpentine-vapors are thus drawn off before they can become contaminated with other vapors, the turpentine-vapor being given off at approximately 321° Fahrenheit. When the heat reaches 400° Fahrenheit at the top of the retort, the wood at that point will give off tar and creosote oils, while the wood below it, being cooler, is still giving off turpentine-vapors. If the turpentine-vapors should be passed through the wood that is giving off creosote and tar vapors, the turpentine, being a powerful solvent of these oils, would become impregnated with them, and thus rendered impure and much less valuable. A steady heat is maintained in the furnace until the heat has progressed downwardly to the back of the retort and raised the entire contents of the latter to a point above that at which the turpentine is given off, by which time all of the turpentine-vapors will have been withdrawn. As soon as the turpentine in the wood has been extracted and creosotic and tarry vapors are given off the valve *h* is closed and the valve *i* is opened, whereupon the vapor is discharged through the pipe I to other condensers and is prevented from passing to and contaminating the condensers for the turpentine. During the process the valve *g* may be opened as often as necessary to keep the eduction-pipe B free of the liquid tar. The heat is continued until all of the vapors have been driven out and until the tar has likewise been expelled through the eduction-pipe B, leaving only the charcoal which remains at the end of the distillation.

It will be seen that the construction and arrangement of the heating devices enables me to discharge the heat upon the top of the retort only and that the latter is so protected that it receives practically no heat except along its upper side, so that a downwardly-progressive heating of the contents of the retort is insured. The interposition of the horizontal wall D between the combustion-chamber of the furnace and the bottom of the retort and the body of dead air in the chamber above said horizontal partition enables me to control the temperature in the retort and hold it at the proper degree to cause the wood to give off the turpentine or the tar-oils as desired. The fact that the bottom of the retort remains relatively cool until the very last stages of the process insures that the native tar-oil will run out through the eduction-pipe instead of being burned up. The fact that the eduction-pipe leads out through the smoke-chamber and outlet-passages of the furnace insures that the tar and pitch will be maintained in a sufficiently fluid condition to flow freely, and will, therefore, not chill and choke up the discharge-pipe.

It will be obvious from the foregoing description that the details of construction and arrangement of the apparatus may be modified without departing from the invention, and I do not, therefore, limit myself to such details except to the extent that they are made the subject of specific claims.

The novel process of the destructive distillation of wood which is herein described as carried out by the use of the apparatus forming the subject of the present application is made the subject of a divisonal application, Serial No. 136,504, filed contemporaneously herewith.

I claim as my invention—

1. In an apparatus for the destructive distillation of wood, the combination of a closed retort, means for locally applying heat externally to a part only of said retort, to effect the progressive heating of the contents of the latter, and an eduction vapor-passage communicating with the retort at a point remote from the part thereof to which the heat is applied, whereby the vapors expelled are withdrawn from the cooler portion of the retort.

2. In an apparatus for the destructive distillation of wood, the combination of a closed retort, means for locally applying transmitted heat to a part only of said retort, to effect the progressive heating of the contents of the latter, and an eduction-passage communicating with the retort at a point remote from the part thereof to which the heat is usually transmitted.

3. In an apparatus for the destructive distillation of wood, the combination of a closed retort, means for locally applying heat exteriorly to the upper side only of said retort, means protecting the remaining portions of said retort from overheating, and an eduction-pipe communicating with the lower part of the retort.

4. In an apparatus for the destructive distillation of wood, the combination of a closed elongated horizontally-disposed retort having its bottom inclined toward one end; means for circulating hot gases over the top of said retort; means protecting the sides and bottom of said retort from overheating, and an eduction-pipe communicating with the bottom of the retort and leading downwardly and outwardly therefrom.

5. In an apparatus for the destructive distillation of wood, the combination of a closed elongated horizontally-disposed retort having its bottom inclined toward one end; means for circulating hot gases over the top of said retort; means protecting the sides and bottom of said retort from overheating, and an eduction-pipe communicating with the bottom of the retort and leading downwardly and outwardly therefrom, said eduction-pipe being arranged to extend through a discharge-passage for the hot gases.

6. In an apparatus for the destructive distillation of wood, the combination substantially as described, of the retort having a vapor-discharge at its lower end, the furnace, the protecting-wall leading from said furnace rearwardly below the retort and forming a dead-air chamber below such retort, the flues arranged to receive the products of combustion from such protecting-wall at a point near the rear end of the retort and extending thence forward to a point near the front of the retort, and a casing provided with flues and passages for receiving the products of combustion from said flues and directing the same to the top of the retort, substantially as set forth.

7. In an apparatus for the destructive distillation of wood, the retort for receiving the wood provided with a discharge-pipe having the branch H, the branch I and the branch or discharge G, and provided with the valves *h*, *i* and *g* for controlling the discharge of the products of distillation, substantially as set forth.

8. An apparatus for the destructive distillation of wood comprising the retort for receiving the wood, the furnace, a protecting-partition between the furnace and retort, flues extending between the partition and retort and arranged at their rear ends to receive the products of combustion from the furnace and to discharge the same to the retort at the front end of the latter, means for directing such products substantially to the top of the retort, and the tar and vapor discharge at the lower end of the retort, substantially as described.

GEORGE O. GILMER.

Witnesses:
JNO. F. C. WALDO,
T. A. BECK.